INVENTOR.
GERHART WEISS
BURT W. ENSMANN
BY
Auslander & Bernstein
ATTORNEYS

INVENTOR.
GERHART WEISS
BURT W. ENSMANN
BY
Auster & Rothstein
ATTORNEYS

TAPE TALKING MECHANISM

Filed Nov. 18, 1969 3 Sheets-Sheet 3

INVENTORS
GERHART WEISS
BURT W. ENSMANN
BY
Auster & Rothstein
ATTORNEYS

United States Patent Office 3,664,673
Patented May 23, 1972

3,664,673

TAPE TALKING MECHANISM

Gerhart Weiss and Burt W. Ensmann, Flushing, N.Y., assignors to Ideal Toy Corporation, Hollis, N.Y.

Filed Nov. 18, 1969, Ser. No. 877,636
Int. Cl. G11b *25/06;* A63h *3/28;* G11b *17/06*
U.S. Cl. 274—11 R 6 Claims

ABSTRACT OF THE DISCLOSURE

A miniature tape talking mechanism. The tape is supported by a rotatable capstan positioned below the stylus to minimize noise in the audible message. The capstan is made of metal so that its relatively large inertia prevents up-and-down movement of the capstan during play of the device in order that maximum vibrations be transmitted to the speaker cone. The tone arm element has two legs in the shape of a V. At the tip of one leg is the stylus for tracking a tape groove, and at the tip of the other leg is a cam follower for tracking a cam groove which is rotated during wind-up of the unit. The final position of the cam follower determines the message on the tape selected for play. The resilient tone arm element prevents jumping from track to track during a play of the device even if the mechanism is jarred. Either (or both) of the ends of the tape can be attached to a respective drum simply by folding it and inserting the folded end of the tape into a notch on the drum; this eliminates the need for a fastening element and reduces assembly time.

This invention relates to miniature phonograph mechanisms, and more particularly to such a mechanism which is provided with a tape having many individual messages recorded thereon, one of which is randomly selected for each play of the device.

Miniature talking mechanisms have been incorporated in dolls and toys for many years. A popular type of mechanism is that in which any one of a number of different messages is selected at random for each play. Typically, the record medium is either a phonograph disc on which a number of interleaved sound grooves are formed, or a tape having a number of parallel sound grooves. In a typical tape-type mechanism, as the child pulls the string which winds up the spring to thereafter drive the tape, the stylus moves across the width of the tape. The final position of the stylus determines the particular message which is played when the string is released by the child.

The tone arm which contains the stylus generally bears directly against the speaker cone. As the stylus tracks the selected sound groove in the tape, the vibrations transmitted through the tone arm to the speaker cone result in an audible message. It is apparent that during the random selection of the message, while the stylus moves back and forth across the width of the tape, if the stylus bears against the tape the tape may be scratched. For this reason, during the wind-up the stylus is generally displaced from the tape. This can be accomplished by moving the tape away from the stylus. In a typical arrangement, the tape is wound on take-up and supply drums and passes over a supporting surface directly beneath the stylus. This surface is generally lowered (if the mechanism is oriented with the speaker cone facing upward and the tip of the stylus facing downward) during the wind-up as the string is withdrawn from the device by the child in order that the movement of the stylus back and forth across the width of the tape not result in the scratching of the tape.

One of the major problems with this arrangement is that the supporting surface introduces noise in the audible message. During play of the device, as the tape moves over the supporting surface, the resulting vibrations (separate and apart from the message vibrations transmitted by the stylus and tone arm to the speaker cone) are transmitted through the frame of the mechanism to the speaker cone and result in an annoying noise. The difficulty in securing a relatively noise-free operation is one of the reasons that tape mechanisms have not attained the popularity of phonograph disc mechanisms.

It is an object of our invention to provide a tape talking mechanism which results in a minimum of noise in the audible message as a result of the tape passing over a supporting surface beneath the stylus.

Another problem with the prior art tape-type mechanism pertains to the tape support which is arranged to move down during wind-up and to move up prior to the actual start of the play of any message. Generally, the tape support is biased upward toward the stylus, tone arm and speaker cone by a spring which is relaxed during play of the device. During wind-up, the tape support is pulled down (generally, by the pulling on the string) against the force of the spring. During play of the device, the tape, stylus and tone arm are wedged between the support and the speaker cone with the tracking force being determined primarily by the force of the bias spring. As the selected message groove passes beneath the stylus, the stylus tracks the groove and moves up and down. Ideally, all of the up-and-down movement of the stylus and tone arm should be transmitted to the speaker cone for the utmost clarity of the message. However, it is apparent that the same force which is effective to move the stylus up and down is effective to move the tape support up and down as well. The rigidity of the speaker cone is generally much greater than that of the bias spring, and thus a considerable part of the total up-and-down movement caused by the sound groove is exhibited by the tape support and bias spring moving up and down (along with the stylus and speaker cone). There is necessarily a degradation in the clarity and loudnes sof the resulting message.

It is another object of our invention to minimize movement of the tape supporting surface during play of a message in order that almost all of the up-and-down motion caused by the tape groove result in vibrations of the speaker cone.

In a typical prior art tape talking device of the type described, the stylus is controlled to move back and forth across the width of the tape during wind-up by providing the tone arm with a cam follower which follows a cam, the cam being rotated by the withdrawal of the string by the child. Typically, the string passes over the cam, and as the string is pulled the cam is turned. The tone arm includes a follower of some kind which tracks a groove on the cam and converts the rotary motion of the cam to a back-and-forth movement of the tone arm (stylus) across the width of the tape. It is apparent that during play of the device the cam should remain stationary in order that the selected message be played through its entirety—if the cam rotates slightly, the cam follower attached to the tone arm would necessarily move and cause the stylus to jump from one groove to another. For this reason, in most prior art mechanisms of the type described the cam which controls the random selection of the message is held stationary during play of the device. However, it has been found that small jarring movements can cause the cam to rotate slightly, in which case the stylus jumps from one track to another during the play of a message.

It is another object of our invention to provide a tone arm-cam follower-cam arrangement which prevents a jump of the stylus from one track to an adjacent track during play of the device in the event the cam moves slightly.

It is apparent that for the proper play of any talking mechanism of the type described, the tone arm must be capable of up-and-down movement, and that twisting of the tone arm should be avoided since this would necessarily degrade the transmission of the maximum vibrations from the tape to the speaker cone. It is also necessary for the tone arm to be able to pivot around the end disposed away from the stylus in order that the stylus be capable of movement back and forth across the width of the tape. Generally, in a tape mechanism of the type described, specially designed mountings are required for the tone arm in order to achieve the two desired degrees of freedom and the one desired constraint.

It is another object of our invention to provide a tone arm mounting which requires no additional parts other than those which can be formed in the molding of the tone arm and the housing for the talking mechanism, and which nevertheless results in the desired movement of the tone arm.

There are a number of ways in which the two ends of a message tape can be attached to the tape supply and take-up drums. For example, the tape ends can be screwed to each of the drums. The attachments, however, require special elements provided for this purpose as well as assembly time.

It is still another object of our invention to provide tape supply and take-up drums which allow a respective end of the tape to be attached simply thereto and without requiring the use of any additional fastening elements.

Briefly, in accordance with the principles of our invention, the tape support consists of a capstan mounted for rotation on a shaft. The shaft is in turn mounted in a pivotable frame which is spring-biased upward. The tape passes over the capstan. During play of the device. the frame is biased upward to force the capstan and the tape which it supports against the stylus. Because the capstan is capable of rotating as the tape moves over it, there is a minimum of friction between the tape and the capstan; this results in a reduced noise level in the audible message. Furthermore, although most of the parts from which the talking mechanism can be fabricated are typically made of plastic as in the prior art, the rotating capstan is made of a relatively heavy metal such as zinc, lead or brass. The pivotable frame and capstan can move up and down during play of the device, but the increased inertia of the capstan reduces the extent of its up-and-down movement. It follows that most of the up-and-down motion caused by the tape groove which is being played results in motion of the stylus and therefore maximum clarity and loudness.

The tone arm and cam follower are made from an integral piece of plastic which has the general shape of a V. Each leg of the V is approximately one inch long. At the point of the V the tone arm-cam follower is mounted on a post. At the other end of one of the legs there is the stylus, and at the other end of the second leg there is a cam follower which sits in a groove on a rotating cam. The two legs of the V-shaped integral element are resilient. During play of the device, even if the cam turns slightly, the leg containing the cam follower is simply moved a bit toward the tone arm leg without any accompanying movement of the tone arm leg. (The tracking force is sufficient to keep the stylus in place even though the cam follower leg of the structure move slightly.) Thus slight jarring of the mechanism during play of a message does not result in the stylus jumping from one track to another.

The pivot end of the V-shaped tone arm-cam follower structure is provided with a hole extending from the uppermost surface of the element to its lowermost surface. The size of the hole is greater at the uppermost surface than at the lowermost surface. Because of the shape of the hole in the tone arm, the tone arm is capable of up-and-down movement with a minimum of twisting. The tone arm can be mounted to the housing simply by molding a post in the housing during its manufacture and thereafter placing the tone arm on the post.

Either (or both) of the tape supply and takeup drums is provided with a notch having the general configuration of a V with a lip extending from the tip of one of the legs in toward the center. An end of the tape is folded over and the bent tape is slipped into a respective notch in the drum. It has been found that this arrangement is sufficient to hold the tape secured to the drum despite the fact that no additional fastening elements are utilized.

It is a feature of our invention to provide a capstan mounted for rotation to support the message tape in a talking mechanism, the capstan rotating with the tape during play of the device to reduce the noise level in the audible message.

It is another feature of our invention to mount the capstan in a pivotable frame such that the capstan is forced away from the stylus during wind-up of the device and is forced up toward the stylus during play of the device, the capstan being made of metal so that its inertia is great enough to allow most of the up-and-down movement caused by the sound groove being tracked by the stylus to result in up-and-down motion of the tone arm rather than the capstan.

It is another feature of our invention to provide a tone arm having two resilient legs joined in a V configuration, with the tip of one leg carrying the stylus, the tip of the other leg carrying a cam follower which tracks a cam to control back and forth movement of the stylus across the width of the tape during wind-up of the device, and a hole at the point of the V-shaped element for mounting it on a post, the hole having a modified elliptical shape with a major axis at the upper end thereof which is greater than the major axis at the lower end thereof.

It is still another feature of our invention to provide a V-shaped notch having a lip in one or both of the tape supply and take-up drums for allowing the tape to be secured to either drum simply by folding an end thereof and slipping it into the notch.

Further objects, features and advantages of our invention will become apparent upon a consideration of the following detailed description in conjunction with the drawing, in which.

Figures 1, 2, 3:
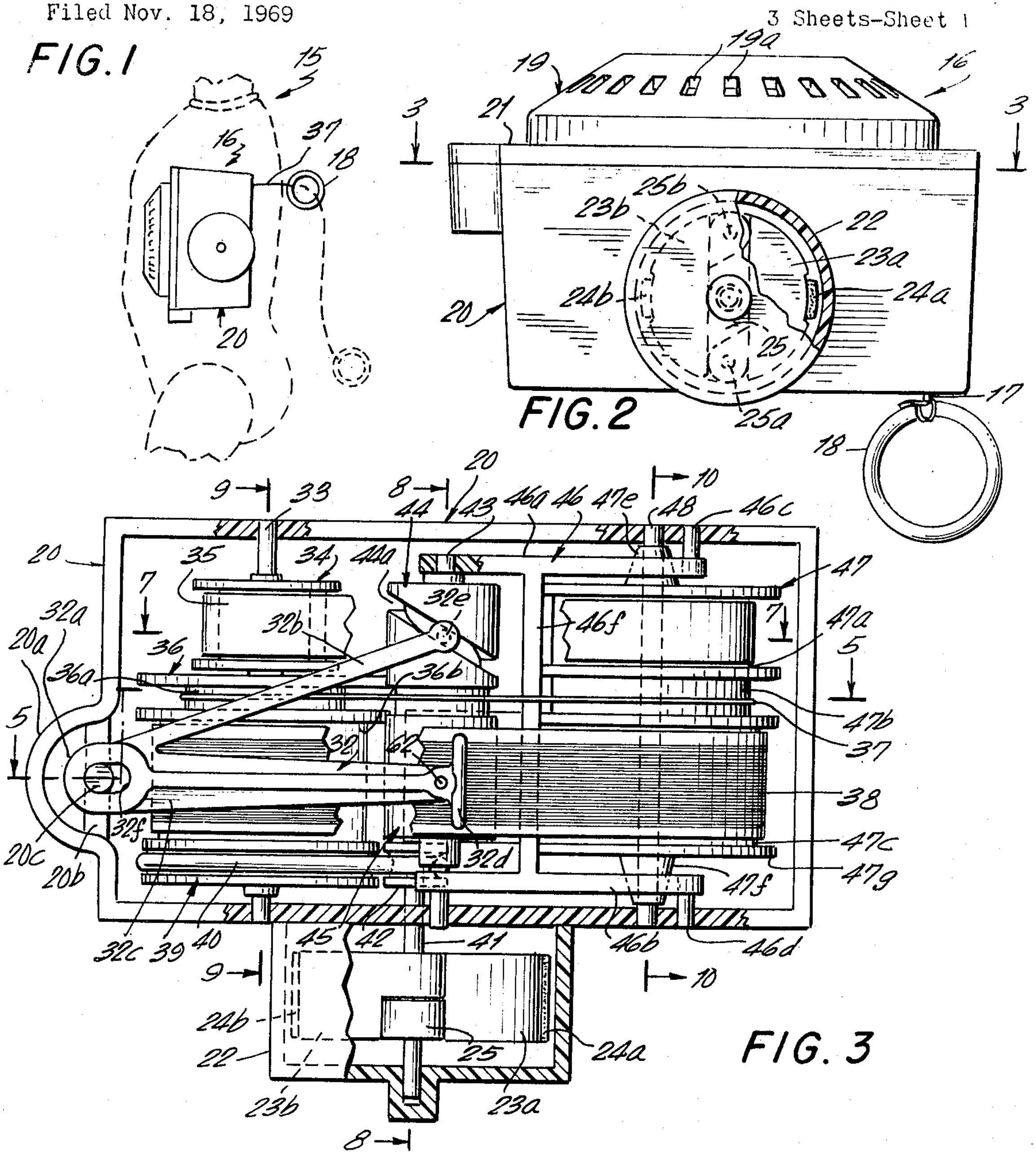
FIG. 1 depicts the manner in which the talking mechanism of the invention can be incorporated in a doll.
FIG. 2 is a side view of an illustrative talking mechanism designed in accordance with the principles of the invention, the talking mechanism being shown partially broken away.
FIG. 3 is an upper view, shown partially broken away, of the talking mechanism taken through the line 3—3 of FIG. 2.

FIG. 1 shows a doll 15 with talking mechanism 16 mounted in it. The talking mechanism can be mounted in one of many well known ways. A string 37 extends out of the talking mechanism and is attached to a pullring 18. The string can be drawn out of the doll as shown by the dotted lines in FIG. 1.

Figures 5, 6:
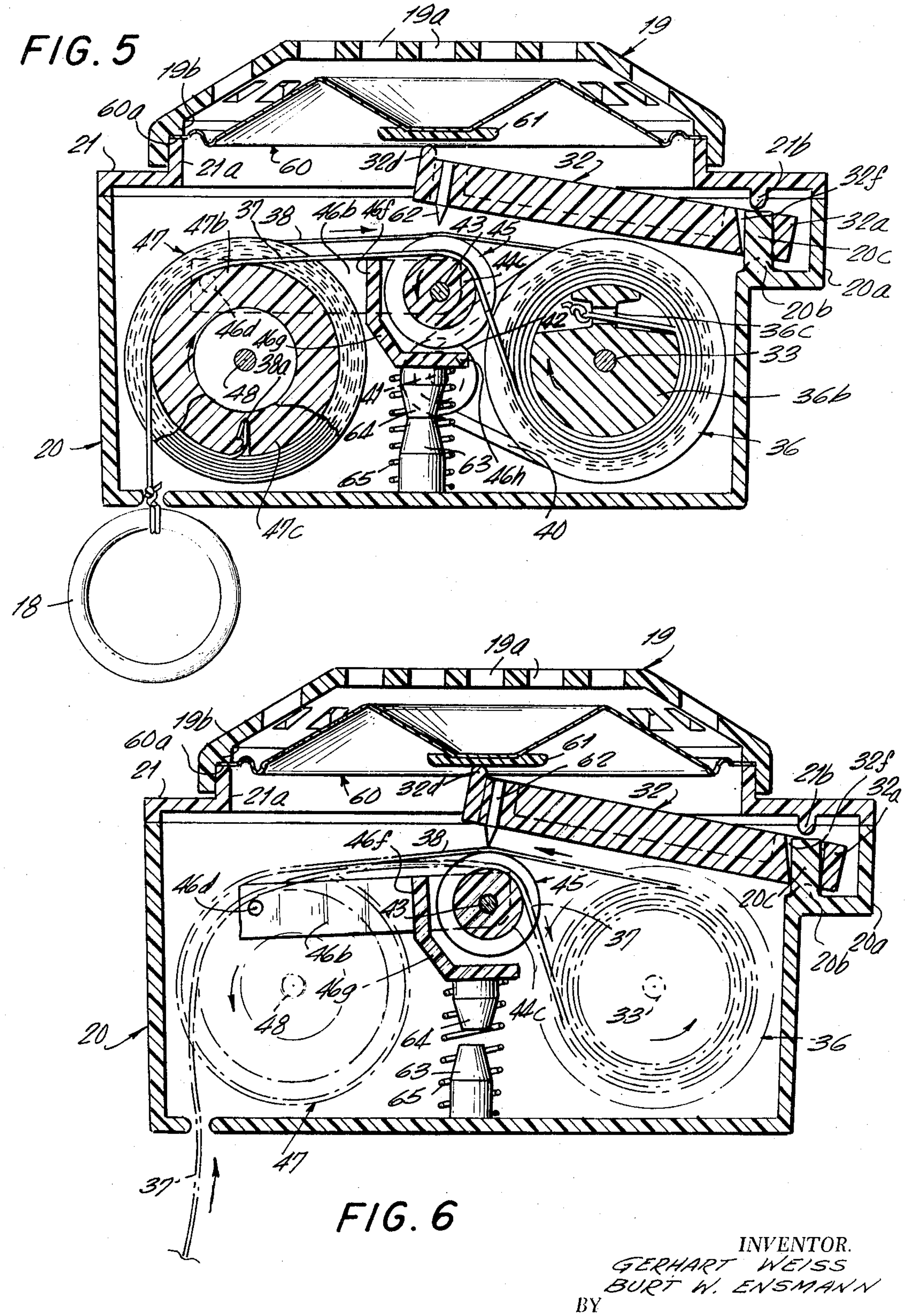
FIG. 5 is a sectional view shown partially broken away, taken through the line 5—5 of FIG. 3.
FIG. 6 is a view similar to that of FIG. 5 but shows the position of the various elements in the device during play rather than wind-up.

As seen most clearly in the views of FIGS. 2 and 5, the housing of the talking mechanism comprises three parts—a base housing 20, a cover plate 21, and a perforated (19a) speaker enclosure 19. Speaker cone 60 is mounted along its rim 60a between rim 21a of plate 21 and rim 19b of speaker enclosure 19. After the talking mechanism is assembled inside base housing 20, plate 21 can be secured to housing 20 by gluing the two sections together. Then speaker cone 60 and speaker enclosure 19 can be attached to plate 21, for example, by gluing the various pieces together.

Extending through housing 20 are two shafts 33 and 48. These shafts can be secured as is known in the art, for example, by pinning the ends thereof. Three integral elements are mounted on shaft 33—spring take-up drum 34, integral string take-up drum 36a and tape supply drum 36b, and belt pulley 39. The arrangement is seen most clearly in FIG. 9. Spring take-up drum 34 is mounted for free rotation on shaft 33. To the right of this drum is element 36 on which string 37 is wound in the nonplaying position. One end of the string is attached by inserting it through a hole 36c in the drum and knotting the end of the string as shown in FIG. 5. Also on drum 36b of element 36 there is attached one end of tape 38. In the nonplaying position most of the tape is withdrawn from the tape supply drum 36b.

Figure 9:
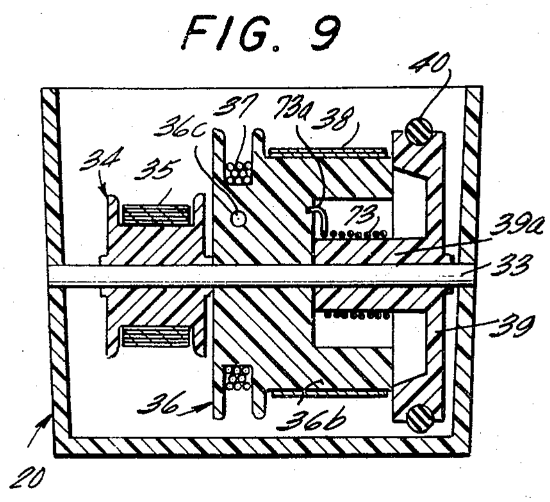
FIG. 9 is a sectional view taken through the line 9—9 of FIG. 3.

The rightmost end of element 36 is open (FIG. 9). Belt pulley element 39 includes an extension 39a which is mounted on shaft 33 within element 36. Wrapped around extension 39a is a clutch spring 73 which is mounted loosely on the extension but has one end 73a bent and inserted into a notch provided for this purpose in element 36. During wind-up of the mechanism, element 36 moves in a direction which tends to uncoil spring 73. Consequently, the clutch spring simply rotates on extension 39a and does not cause belt pulley 39 to rotate with it. However, during play of the device, element 36 rotates in the opposite direction which tends to tighten spring 73. The reduced internal diameter of the coil spring grips extension 39a and causes the governor pulley to rotate with element 36. In this manner, the governor pulley is made to rotate only during play of the device, not during wind-up.

Figure 10:
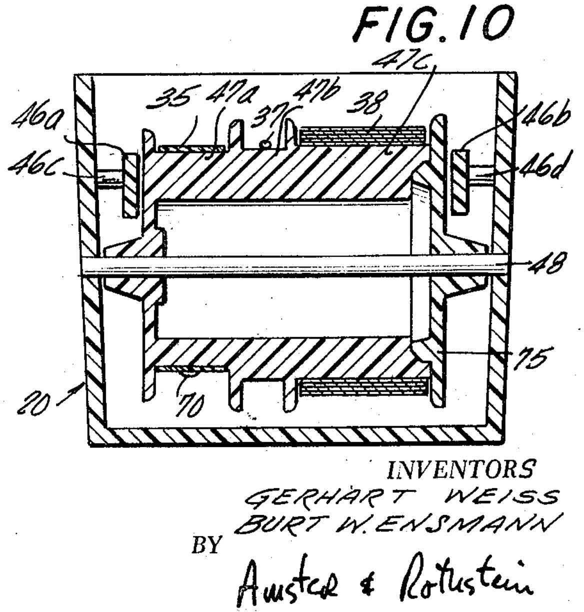
FIG. 10 is a sectional view taken through the line 10—10 of FIG. 3.

Shaft 48 carries two elements as seen most clearly in FIGS. 3 and 10. Actually, while the element consists of two parts (47 and 75), two parts are utilized only so that in the molding of the parts plastic material can be saved by forming a hollow interior. The two parts function as one integral element.

Element 47 includes two drums, tape take-up drum 47c and spring supply drum 47a. One end of the spring is attached to the spring supply drum as shown by screw 70. The other end of the spring is loosely coiled on the take-up drum 34 on shaft 33. Tape 38 is attached at its two ends to drums 47c and 36b as will be described below. Element 47 further includes a surface 47b over which string 37 passes as it is extended toward the outside of base housing 20, as seen most clearly in FIG. 5.

As seen in FIG. 3, a yoke 46 is pivotally mounted in housing 20 by pivot shafts 46c and 46d which are adjacent respectively to the two ends of shaft 48. The yoke has two side sections 46a, 46b and bridging section 46f (FIG. 3). As seen most clearly in FIGS. 5 and 8, at the bottom of bridging section 46f there is a section 46g terminating in a horizontal section 46h, on which is mounted post 64. At the bottom of the housing there is another post 63, and spring 65 is disposed around the two posts bearing against the bottom of the housing and the lower surface of section 46h of the yoke. The spring tends to force the yoke upward.

Figure 4:
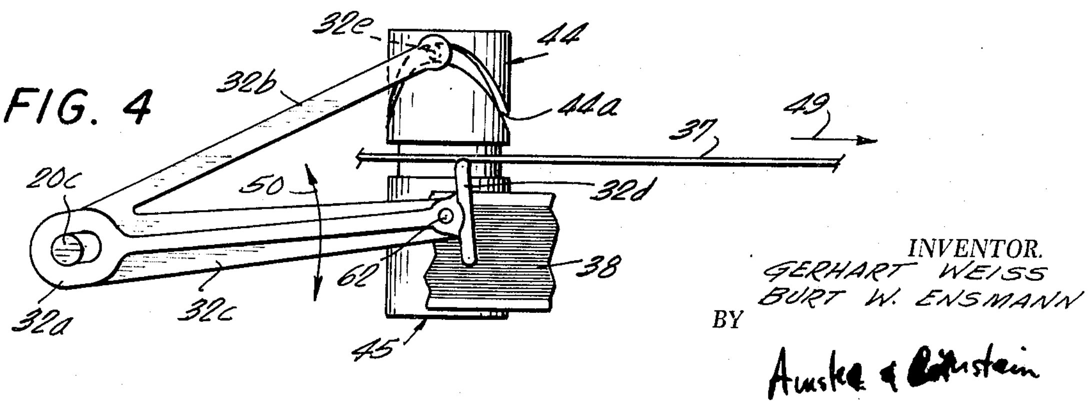
FIG. 4 depicts the tone arm and some of the associated elements shown in FIG. 3, but in a different position to facilitate an understanding of the random selection of a message.
Figures 7, 8, 11:
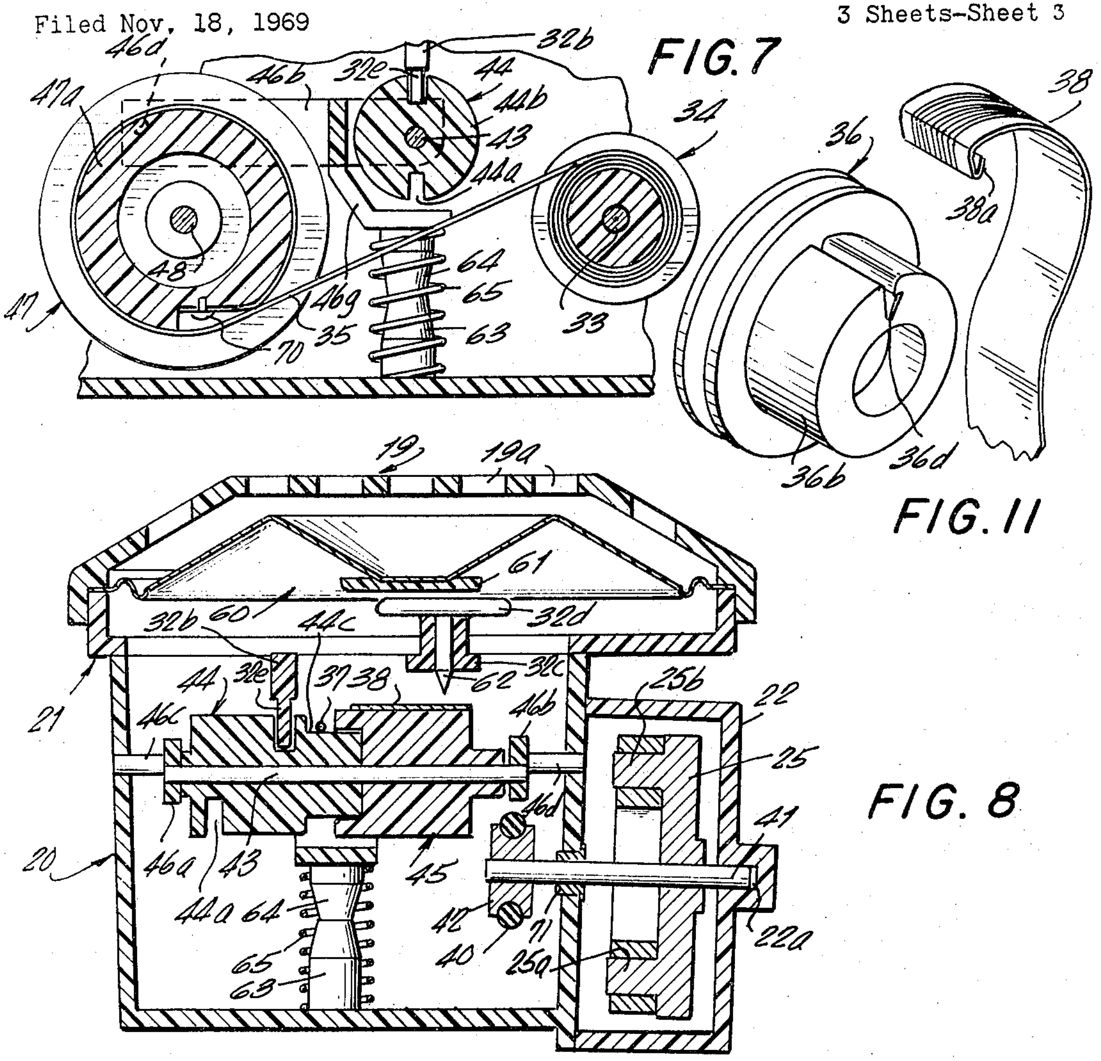
FIG. 7 is a sectional view taken through the line 7—7 of FIG. 3.
FIG. 8 is a sectional view taken through the line 8—8 of FIG. 3.
FIG. 11 is a perspective view showing the attachment of one end of tape 38 to tape take-up drum 36.

Shaft 43 extends through the two ends of the yoke (FIG. 8). At one end of the shaft there is mounted for rotatable movement a cam 44 having a groove 44a therein. The groove is a closed loop as shown in FIGS. 3 and 4. Adjacent to cam 44 there is mounted on the shaft a metal capstan 45. The capstan actually fits over one end of cam element 44 to define a string guide 44c. String 37 passes over the cam in this guide region, and tape 38 passes over the capstan.

On the side of base housing 20 is a governor enclosure 22, attached in any conventional manner, for example, by glue. Shaft 41 extends through bearing 71 in the side wall of housing 20 and is contained in its other end in a hole 22a formed in housing 22 for this purpose. The shaft is mounted for rotatable movement. At the other end of the shaft there is attached belt pulley 42. Belt 40 is mounted around pulleys 39 and 42, and, as described above, the pulley is rotated during play of the device. When the pulley rotates, shaft 41 rotates with pulley 42. Attached to shaft 41 is a bar 25 on opposite sides of which are posts 25a, 25b. Conventional governor shoes 23a, 23b are mounted on these posts. This is seen most clearly in the views of FIGS. 2, 3 and 8. At the outer edge of each governor shoe there is a friction pad 24a, 24b. As the shaft 41 rotates during play of the device, the governor shoes spring outward and the pressure pads make frictional engagement with the inside of governor enclosure 22. The resulting drag tends to regulate the speed of tape 38 as it rewinds back onto drum 47c during play of the device.

Element 32 is V-shaped and has two legs 32b, 32c. At the tip of leg 32b there is a cam follower 32e which tracks groove 44a in cam 44. This is shown most clearly in FIGS. 3, 4 and 8. At the tip of leg 32c there is mounted a stylus 62 as seen most clearly in the view of FIG. 8. Upstanding ridge 32d of element 32 bears against a button 61 mounted in the central region at the bottom of the speaker cone 60.

At the point of the V-shaped element 32, there is a hole 32f extending through the element. On housing 20 there is a horizontal section 20b with a post 20c extending upward. The V-shaped element 32 is mounted in the unit with its hole passed over post 20c. As seen in FIGS. 5 and 6, the element is kept in place when plate 21 is placed over the base housing by a lug 21b positioned above post 20c.

As seen most clearly in FIGS. 3–5, the parallel side walls of hole 32f of the V-shaped element are separated by an amount equal to the diameter of post 20c. This prevents twisting of element 32. The major dimension of hole 32f is larger at the top of element 32 than it is at the bottom of the element. This permits rocking of the element, as seen in FIGS. 5 and 6, resulting from the increased size of the hole at the top of the element. The element is, of course, also capable of movement in a horizontal plane around post 20c.

In the rest position of FIG. 5, spring 35 is coiled around drum 34, string 37 is coiled around drum 36a and tape 38 is coiled around drum 47c. However, the spring is not completely wound on drum 34. The spring has a tendency to wind completely around drum 34, and it is apparent that as the spring winds around this drum element 47 rotates in a direction such that tape 38 winds up on drum 47c. Thus there is a tension force in the tape tending to rotate element 36 in the direction which pulls string 37 into the unit. However, the string can be pulled into the unit only until pullring 18 abuts against the bottom of base housing 20. Since the spring is not completely coiled around drum 34 when the pullring engages the housing, there is tension in the string. This tension applies a downward force to cam 44. The yoke is forced downward against the force of spring 65.

As the child withdraws the string from the device, element 36 rotates in the clockwise direction in FIG. 5. This in turn pulls tape 38 from drum 47c and causes it to wind up on supply drum 36b. As the tape is withdrawn from drum 47c element 47 rotates and causes spring 35 to be transferred from drum 34 to drum 47a.

At the same time that the string is withdrawn from the device to wind up spring 35, the string, in passing over cam 44, causes the cam to rotate. At this time yoke 46 is in the position shown in FIG. 5 because the tension in the string forces the yoke downward at the same time that it causes cam 44 to rotate. As the cam and groove 44*a* rotate, cam follower 32*e* follows the groove. Element 32 rocks back and forth on post 20*c* with stylus 62 (now disposed above and in non-engagement with tape 38) moving back and forth across the width of the tape. FIG. 3 shows the stylus in the middle of the tape. In FIG. 4, cam 44 is shown as having rotated to the point where cam follower 32*e* is in its furthermost position toward leg 46*a* of the yoke. In this position the stylus is above the groove which is along one edge of tape 38. As the cam continues to rotate, the stylus moves across the width of the tape until it is above the furthermost groove along the other edge of the tape. Depending on the extent to which the string is withdrawn as well as how it is withdrawn, the stylus ends up above a different one of the many grooves on tape 38.

When the string is released, spring 35 recoils on drum 34. This causes element 47 to rotate in a direction which pulls tape 38 past the stylus as it winds up on drum 47*c*. The speed of the tape is controlled by the governor. As the tape is withdrawn from drum 36*b*, element 36 rotates in a direction which pulls the string into the device. Because there is no tension in the string at this time, there is no force tending to force the yoke downward. Spring 65 forces the yoke upward as shown in FIG. 6; capstan 45 bears up against the support surface of the tape so that the message surface of the tape rises to the tip of stylus 62. At the end of the play, as described above, the tension in the tape results in the yoke being forced down once again as shown in FIGS. 5 and 8.

Although the tape passes over a supporting surface and would ordinarily result in some noise being transmitted to the speaker cone as a result of the sliding of the tape over this surface, in the invention this noise is eliminated. This is due to the fact that a capstan is used as the supporting surface and it is arranged to rotate on shaft 43 as the tape passes over it. There is thus a minimum of friction between the bottom surface of the tape and the supporting surface.

Further, the capstan is made of metal. Referring to FIG. 6, if the capstan remains stationary, the modulations in the groove being played cause the stylus to move up and down. This in turn results in ridge 32*d* forcing the speaker cone to move up and down to render the message audible. However, if the capstan moves up and down as a result of the tracking of the groove by the stylus, it is apparent that there is less up-and-down movement of the cone. The cone is relatively rigid and ordinarily this might result in appreciable up-and-down movement of the capstan (and yoke) with a consequent reduction in the sound level. However, the capstan, in accordance with the principles of the invention, is made of metal and thus has an appreciable inertia; this tends to limit its up-and-down movement during play of the device.

It is apparent that during any play of the device it is necessary for stylus 62 to track continuously the same groove. It is true that there is no tension in string 37. However, the string does pass over cam 44 and it is possible for the cam to rotate slightly. Ordinarily, this would cause element 32, including tone arm leg 32*c*, to move slightly with the result that the stylus would jump from one groove to an adjacent groove. However, this is prevented with the provision of the V-shaped tone arm element made of plastic. The two legs of element 32 are resilient and can be forced in toward each other and out away from each other slightly without the stylus jumping from one groove to the next.

An added advantage of the use of resilient element 32 is that tolerances in the vertical direction are less severe. In the rest position, the top of ridge 32*d* is a little below button 61 as shown in FIG. 5. When the yoke rises at the start of play, the cam follower leg 32*b* rises with the yoke. As leg 32*b* starts to move upward, so does leg 32*a*. But ridge 32*d* soon hits button 61 and leg 32*a* stops rising. If the yoke continues to rise, leg 32*b* can still rise with it; the resilient nature of element 32 allows the two legs to be bent relative to each other in the vertical direction.

Referring to FIG. 10, it is seen that the end of spring 35 is attached to drum 47*a* by screw 70. A similar attachment can be made at the other end of the spring. Since the spring coils around drum 47*a*, it is preferable that the head of the screw be as thin and as flat as possible. Also, there are other known arrangements for attaching the ends of the spring to the drum. Similarly, there are many known techniques for attaching the ends of a tape such as tape 38 to different drums. However, we have discovered a very simple technique for attaching the ends of the tape to respective drums. Referring to FIG. 11, it will be seen that drum 36*b* is provided with a notch 36*d*. The notch is generally V-shaped with a lip extending inward at the end of one leg of the V. The end 38*a* of tape 38 is bent as shown and slipped in from the side into notch 36*d*. We have found that this is all that is necessary to secure the tape to the drum. The notch should, of course, conform as closely as possible to the shape of the end of the tape when it is bent. Referring to FIG. 3, it will be seen that drum 36*b* is not provided with a flange at that side which faces pulley 39. There is no flange at this side of the element 36 in order that the tape be capable of sliding into the notch from the side. When the elements are positioned on shaft 33, pulley 39 serves as the guide for maintaining tape 38 within the notch. A similar attachment of the tape can be made at its other end to drum 47*c*.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A talking mechanism comprising a message tape having message and support surfaces, a tape supply drum, a tape takeup drum, a spring, a spring supply drum, a spring takeup drum, said tape being attached at opposite ends thereof to said tape supply and takeup drums, said spring being attached at opposite ends thereof to said drums, said spring and tape drums being interconnected such that the transfer of said sring from said spring takeup drum to said spring supply drum is accompanied by a transfer of said tape from said tape takeup drum to said tape supply drum, manually controlled means for transferring said spring from said spring takeup drum to said spring supply drum, the release of said transferring means thereafter allowing said spring to transfer from said spring supply drum to said spring takeup drum with said tape being transferred from said tape supply drum to said tape takeup drum, cam means rotatably responsive to the operation of said manually controlled means, a tone arm element, and a tone arm supporting post, said tone arm element including two legs forming a bifurcated member having said legs and a base portion and a stylus disposed above the message surface of said tape for tracking a groove on said tape, said stylus being contained in the tip of one of said legs, the tip of the other of said legs having a cam follower for engaging said cam means and operatively responsive to the rotation thereof for controlling back and forth movement of said stylus across the width of said tape, said tone arm element having a hole therein at said base portion, with said hole having flat planar surfaces, said tone arm supporting post extending through said hole between said planar surfaces and cooperating with said surfaces to prevent twisting of said tone arm on said supporting post, and speaker means responsive to vibrations of said stylus for rendering audible the message in said groove tracked by said stylus; said hole having a major dimension at the surface thereof disposed towards said speaker means which is larger than its major dimension at the surface thereof disposed towards said tape to permit rocking movement of said tone arm element, a capstan disposed adjacent to said tape support surface to serve as a support for said tape, means for forcing said capstan towards said stylus during the play of the mechanism, and means for mounting said capstan in the mechanism to permit the rotation thereof as the tape moves over said capstan.

2. A talking mechanism in accordance with claim 1 wherein said capstan is made of metal.

3. A talking mechanism in accordance with claim 1 wherein at least one end of said tape is folded over, the respective one of said tape supply and take-up drums includes a V-shaped notch with an inwardly projecting lip along the outer periphery thereof, said V-shaped notch conforming to the folded edge of said tape, and said folded edge of said tape is held in said notch for securing said tape to said respective drum.

4. A talking mechanism in accordance with claim 1 further including a tone arm suporting post, said stylus being contained in said tone arm element at one end thereof, a hole in the other end of said tone arm element extending through said tone arm for mounting said tone arm on said supporting post, said hole having flat planar sides cooperating with said post to prevent twisting of said tone arm element on said post and a major dimension at the surface thereof disposed toward said speaker means which is larger than the major dimension at the surface thereof disposed toward said tape to permit rocking movement of said tone arm element.

5. A talking mechanism comprising a message tape having message and support surfaces, a tape supply drum, a tape takeup drum, a spring, a spring supply drum, a spring takeup drum, said tape being attached at opposite ends thereof to said tape supply and takeup drums, said spring being attached at opposite ends thereof to said spring supply and takeup drums, said spring and takeup drums being interconnected such that the transfer of said spring from said spring takeup drum to said spring supply drum is accompanied by a transfer of said tape from said tape takeup drum to said tape supply drum, manually controlled means including a pull string connected to said tape supply drum for transferring said spring from said spring takeup drum to said spring supply drum in response to withdrawal of said pull string from said mechanism, the release of said pull string thereafter allowing said spring to transfer from said spring supply drum to said spring takeup drum with said tape being transferred from said tape supply drum to said tape takeup drum, a tone arm element including a stylus disposed above the message surface of said tape for tracking a groove on said tape, speaker means responsive to vibrations of said stylus for rendering audible the message in said groove tracked by said stylus, a yoke pivotally mounted in said housing, a capstan independent of said takeup and supply drums rotatably mounted on said yoke adjacent to said tape support surface to serve as a support for said tape and being movable in a direction toward and away from said speaker means, means for biasing said capstan towards said stylus during play of the mechanism, said pull string being operatively engaged with said capstan on the side thereof opposite said biasing means and means secured to the free end of said pull string for limiting the drawing of said pull string into said mechanism to hold said pull string under tension by said spring between playing intervals and to overcome the bias of said biasing means whereby said capstan holds said tape away from said stylus between said playing intervals.

6. A talking mechanism comprising message tape having message and support surfaces, a tape supply drum, a tape takeup drum, a spring, a spring supply drum, a spring takeup drum, said tape being attached at opposite ends thereof to said tape supply and takeup drums, said spring being attached at opposite ends thereof to said spring supply and takeup drums, said spring and tape drums being interconnected such that the transfer of said spring from said spring takeup drum to said spring supply drum is accompanied by a transfer of said tape from said tape takeup drum to said tape drum, manually controlled means for transferring said spring from said spring takeup drum to said spring supply drum, the release of said transferring means thereafter allowing said spring to transfer from said spring supply drum to said spring takeup drum with said tape being transferred from said tape supply drum to said tape takeup drum, a tone arm supporting post, a tone arm element rotatably mounted on said post including a stylus disposed above the message surface of said tape for tracking a groove on said tape, speaker means responsive to vibrations of said stylus for rendering audibile the message in said groove track by said stylus, a capstan between said takeup and supply drums adjacent to said tape support surface to serve as a support for said tape, means for forcing said capstan toward said stylus during play of the mechanism, means for mounting said capstan in the mechanism to permit the rotation thereof as said tape moves over said capstan, and cam means rotatably mounted on a common axis with said capstan and rotatably responsive to operation of said manually controlled means, said tone arm including two substantially co-planar legs arranged in a V configuration the plane of said V being substantially parallel to said axis, said stylus being contained in the tip of one of said legs, the tip of the other of said legs having a cam follower for engaging said cam means and operatively responsive to the rotation thereof for controlling back and forth movement of said stylus across the width of said tape.

References Cited

UNITED STATES PATENTS

| | | | |
|---|---|---|---|
| 1,446,929 | 2/1923 | Rivetta | 242—74 |
| 2,550,826 | 5/1951 | Kuhlik | 274—11 R |
| 3,450,239 | 6/1969 | Ryan et al. | 274—1 A |
| 3,466,050 | 9/1969 | Sindlinger | 274—11 R |
| 3,477,728 | 11/1969 | Lindsay et al. | 274—1 A |

LEONARD FORMAN, Primary Examiner

S. STEPHAN, Assistant Examiner

U.S. Cl. X.R.

274—1 A, 15 R